(12) United States Patent
Kim et al.

(10) Patent No.: US 12,261,442 B2
(45) Date of Patent: Mar. 25, 2025

(54) DC-DC CONVERTER, POWER CONVERSION DEVICE, AND SOLAR POWER GENERATION SYSTEM

(71) Applicant: LG INNOTEK CO., LTD., Seoul (KR)

(72) Inventors: Soo Hong Kim, Seoul (KR); Young Woo Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/284,113

(22) PCT Filed: Mar. 25, 2022

(86) PCT No.: PCT/KR2022/004269
§ 371 (c)(1),
(2) Date: Sep. 26, 2023

(87) PCT Pub. No.: WO2022/203473
PCT Pub. Date: Sep. 29, 2022

(65) Prior Publication Data
US 2024/0154425 A1   May 9, 2024

(30) Foreign Application Priority Data
Mar. 26, 2021  (KR) .................. 10-2021-0039924

(51) Int. Cl.
*H02J 3/38* (2006.01)
*H02J 3/12* (2006.01)
*H02J 7/35* (2006.01)

(52) U.S. Cl.
CPC .............. *H02J 3/38* (2013.01); *H02J 3/12* (2013.01); *H02J 7/35* (2013.01); *H02J 2207/20* (2020.01); *H02J 2300/26* (2020.01)

(58) Field of Classification Search
CPC ........ H02J 3/38; H02J 3/12; H02J 7/35; H02J 2207/20; H02J 2300/26
See application file for complete search history.

(56) References Cited

FOREIGN PATENT DOCUMENTS

| JP | 2010-207062 | 9/2010 |
|---|---|---|
| JP | 2015-082198 | 4/2015 |
| JP | 6041216 | 12/2016 |
| KR | 10-2012-0113613 | 10/2012 |
| WO | WO 2019/235657 | 12/2019 |

OTHER PUBLICATIONS

International Search Report dated Jul. 11, 2022 issued in Application No. PCT/KR2022/004269.

*Primary Examiner* — Robert L Deberadinis
(74) *Attorney, Agent, or Firm* — KED & ASSOCIATES, LLP

(57) ABSTRACT

A DC-DC converter according to an embodiment of the present invention comprises: a maximum power point tracking control unit for performing a maximum power point tracking control when a communication module is connected to a solar panel; and a constant current/constant voltage control unit for receiving an input of power output from the maximum power point tracking control unit, outputting power having a constant voltage at the time of constant voltage control, and outputting power having a constant current at the time of constant current control.

20 Claims, 11 Drawing Sheets

【FIG. 1】
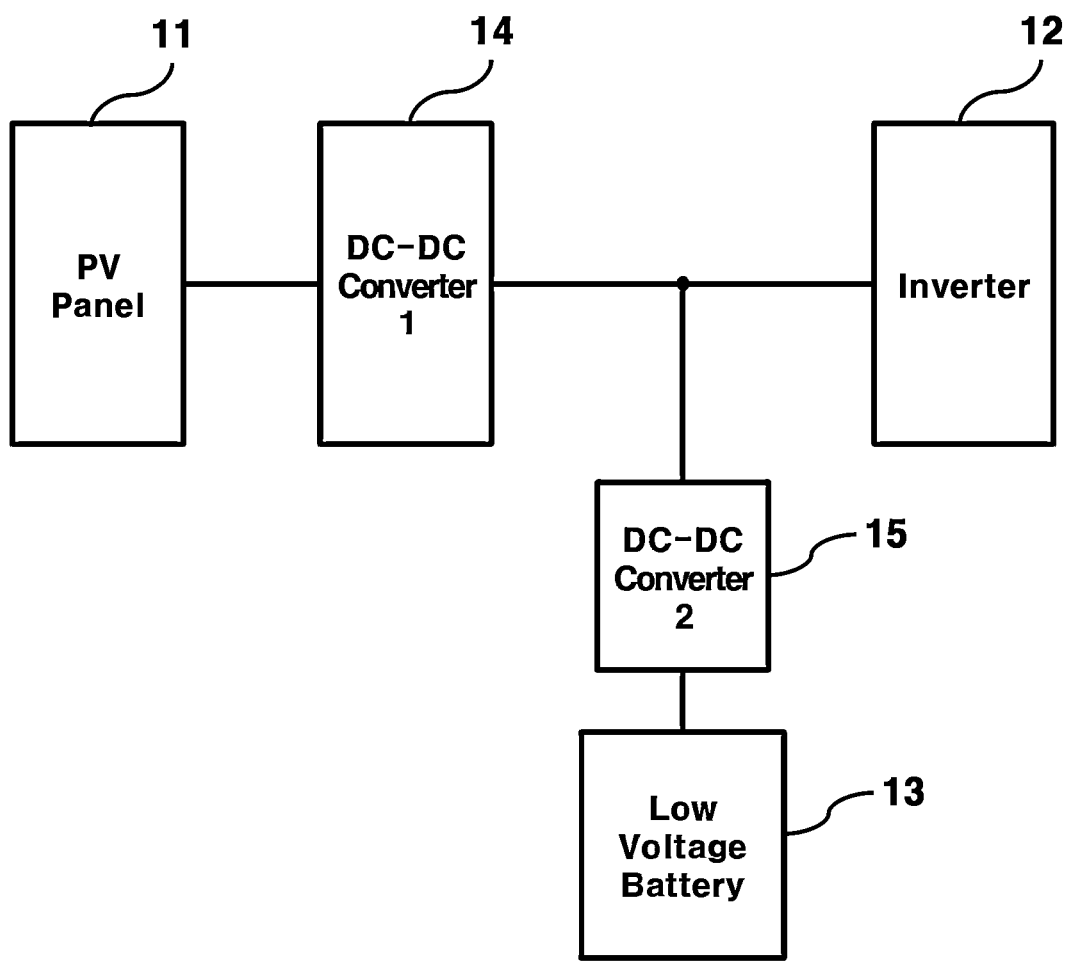

【FIG. 2】
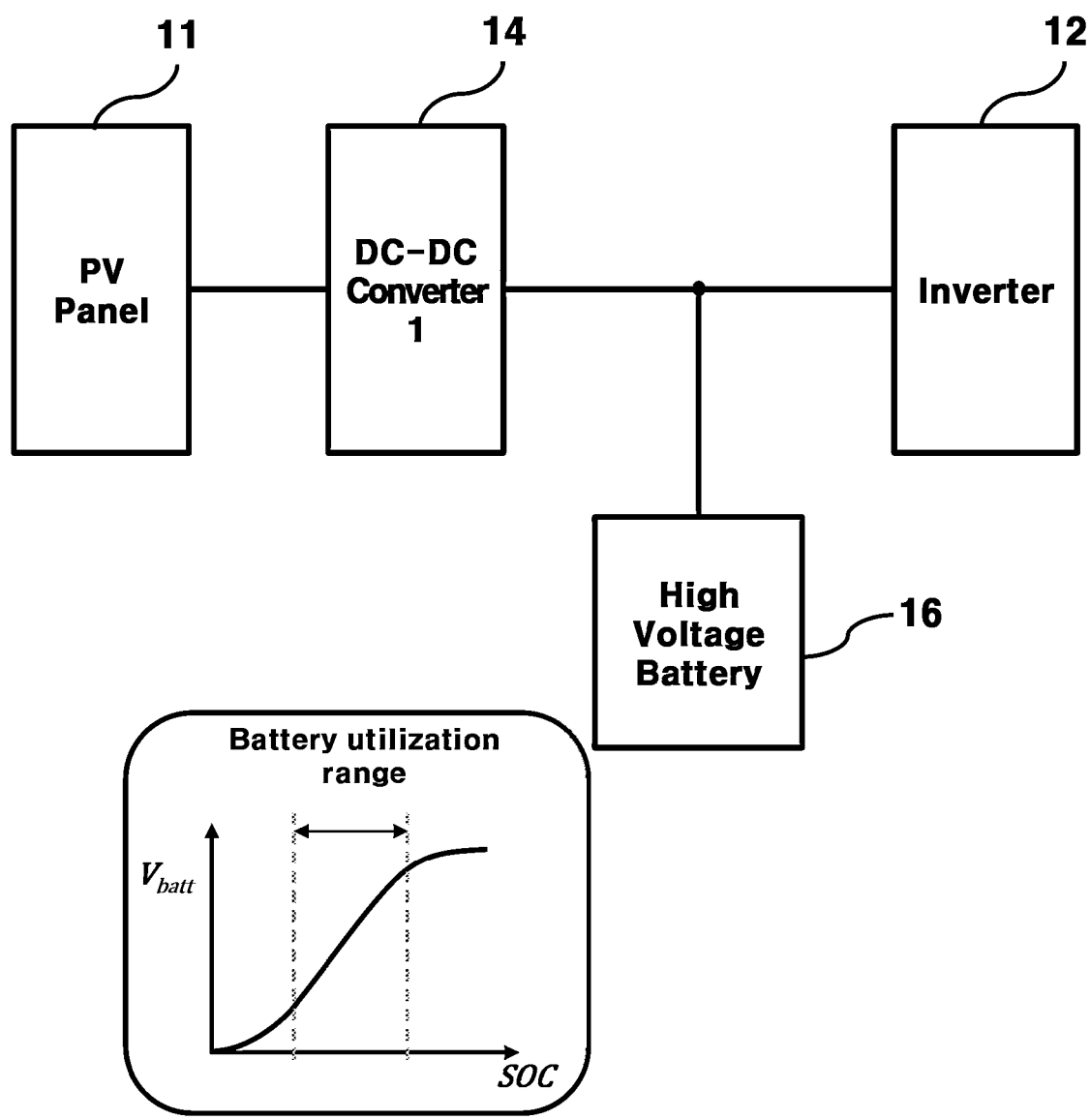

[FIG. 3]
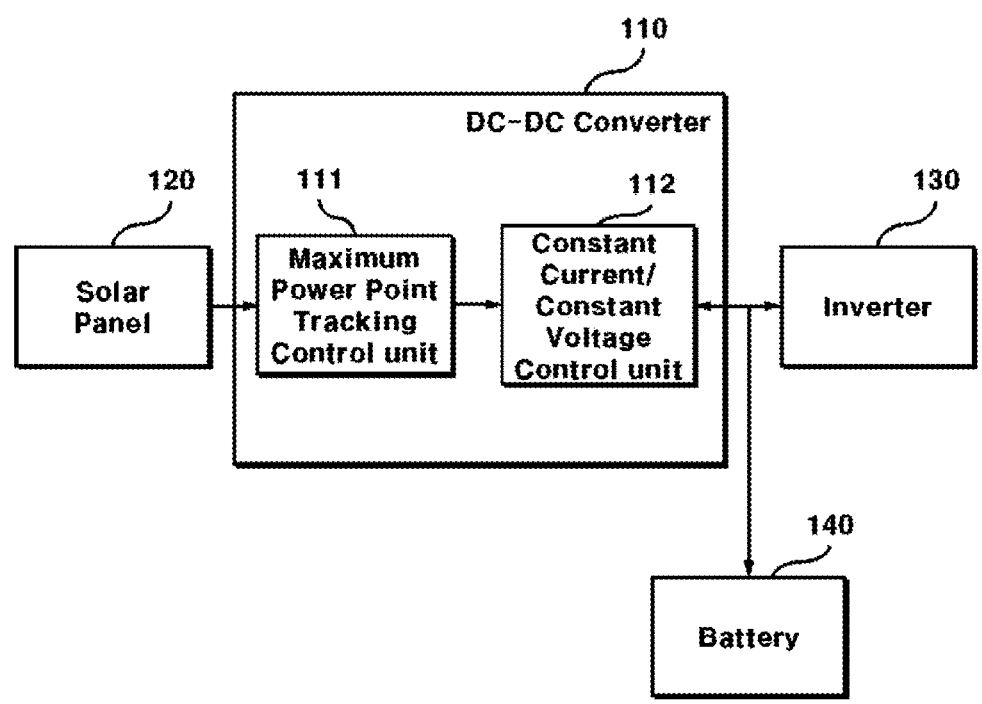

[FIG. 4]
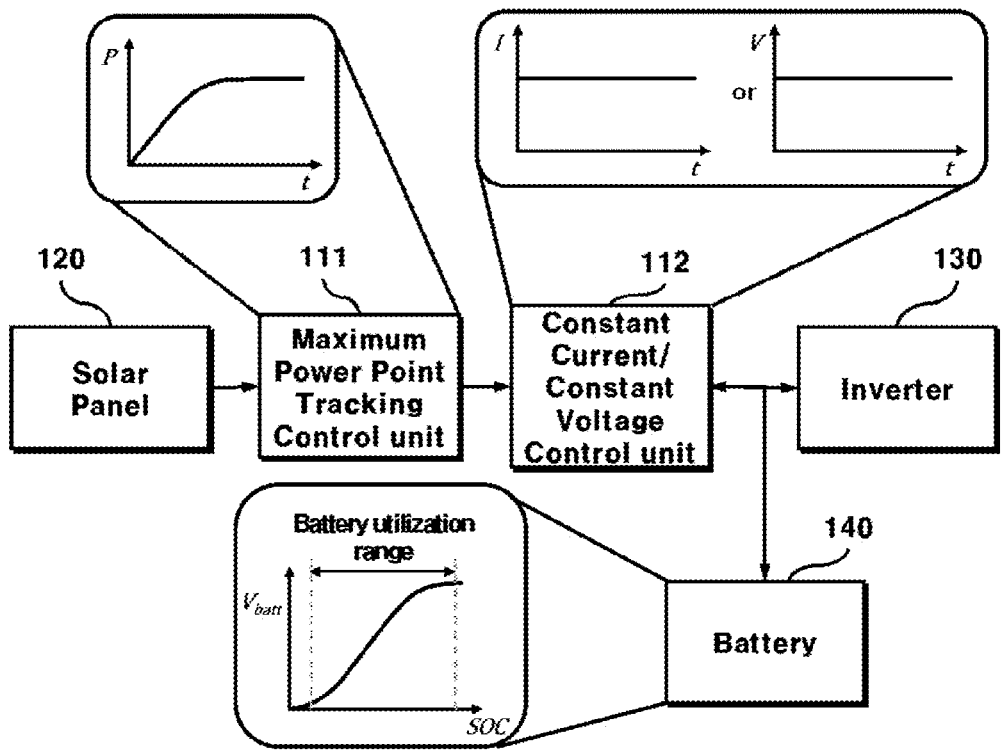
[FIG. 5]
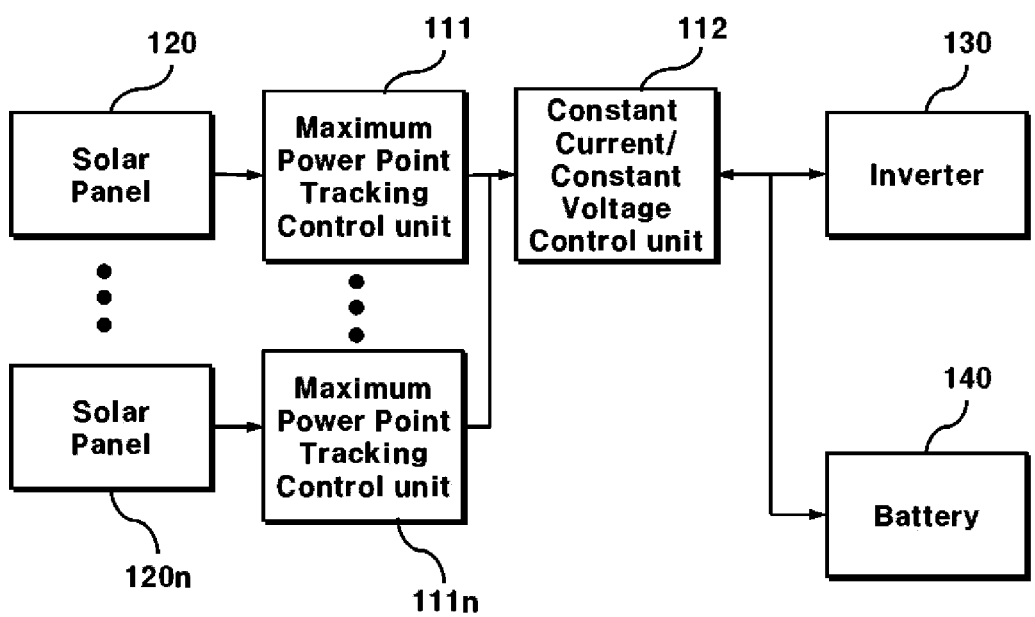

[FIG. 6]
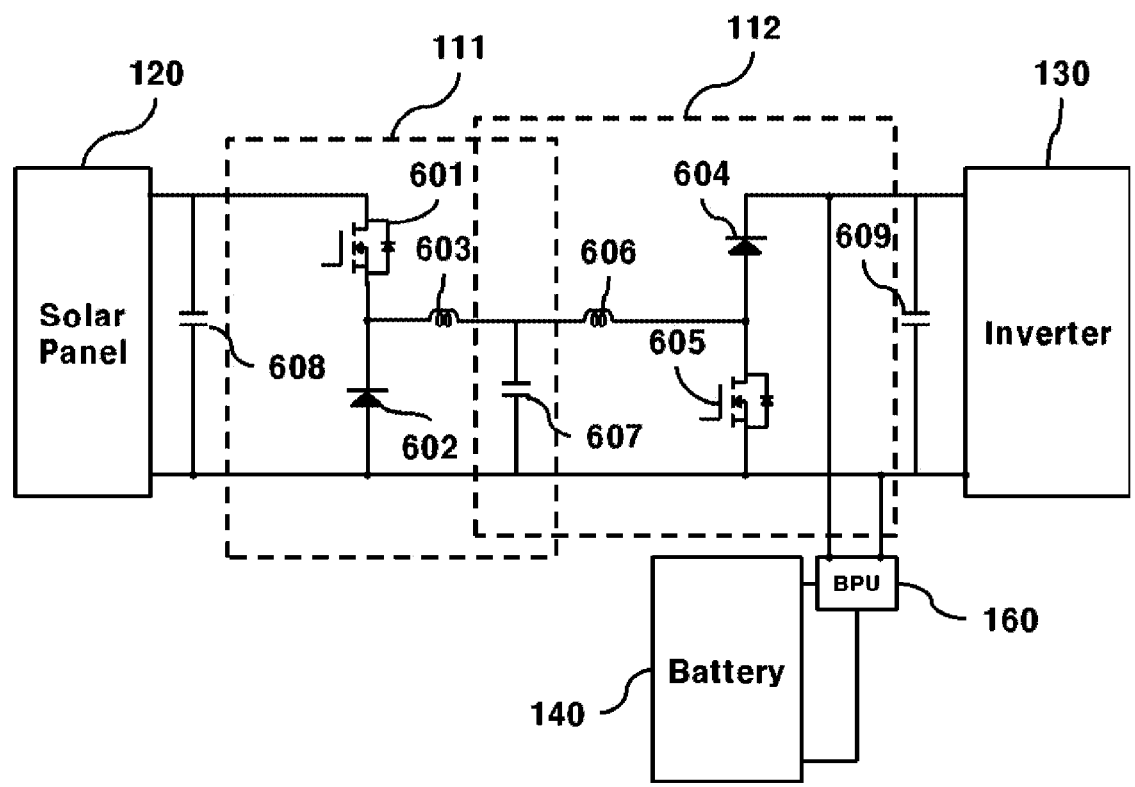

【FIG. 7】
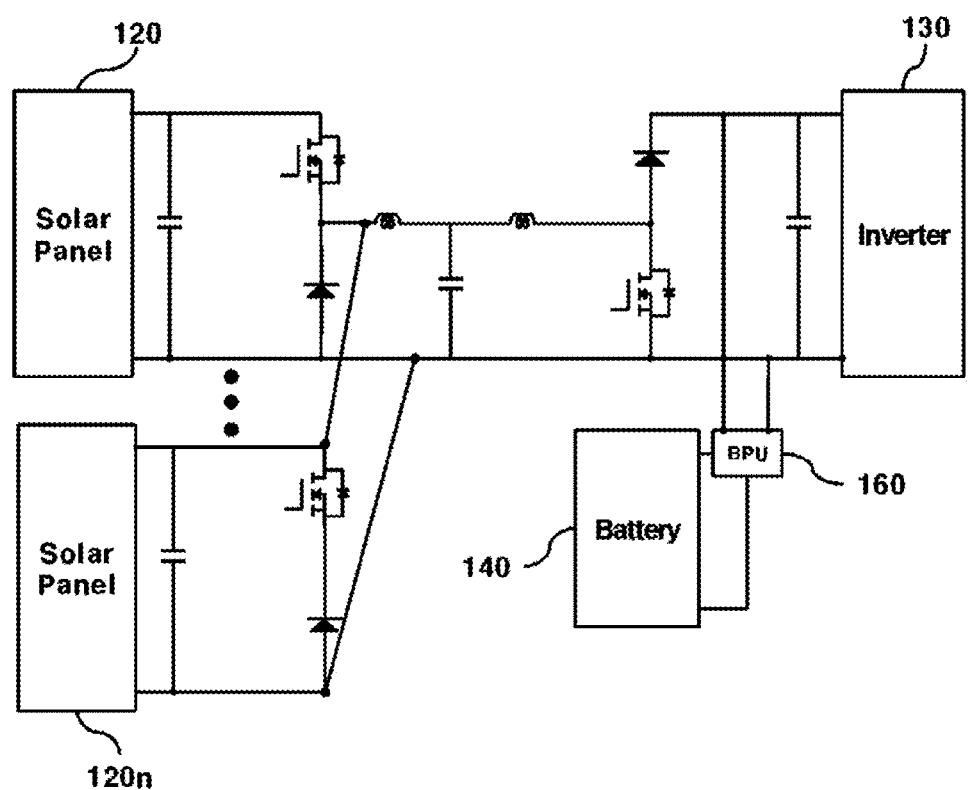

[FIG. 8]
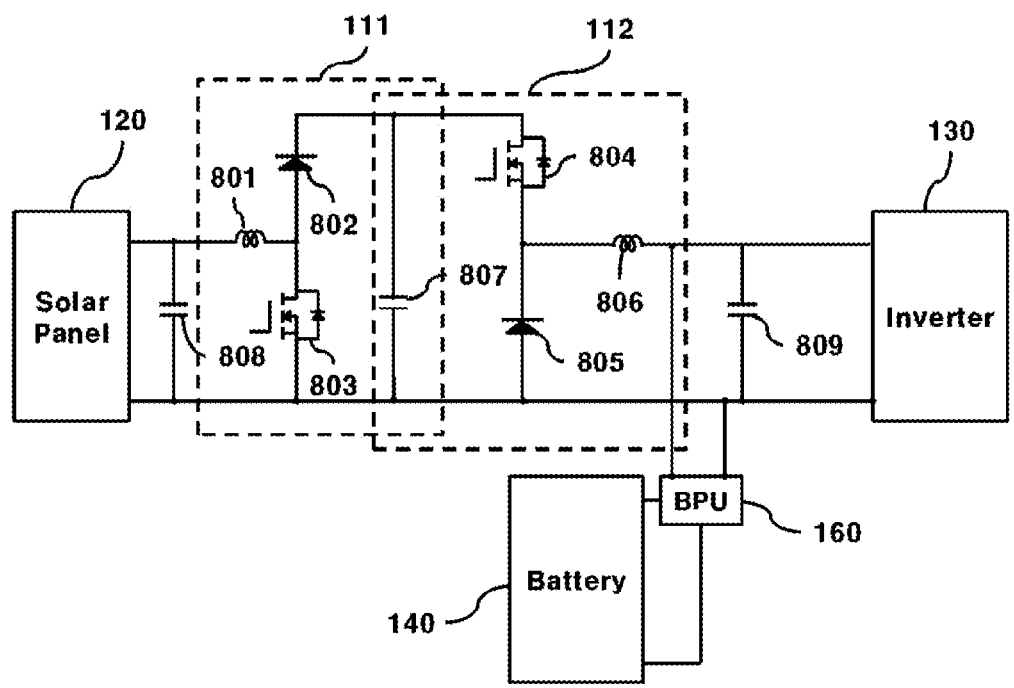

【FIG. 9】
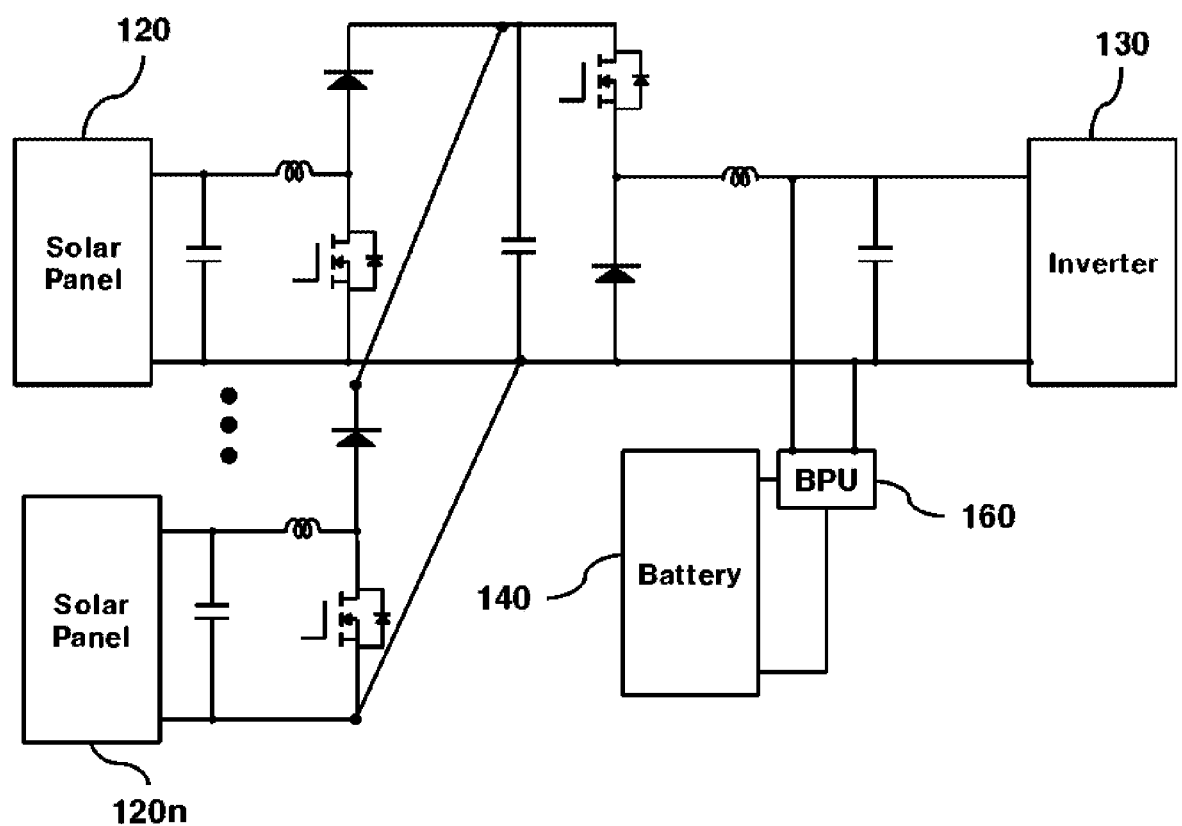

[FIG. 10]
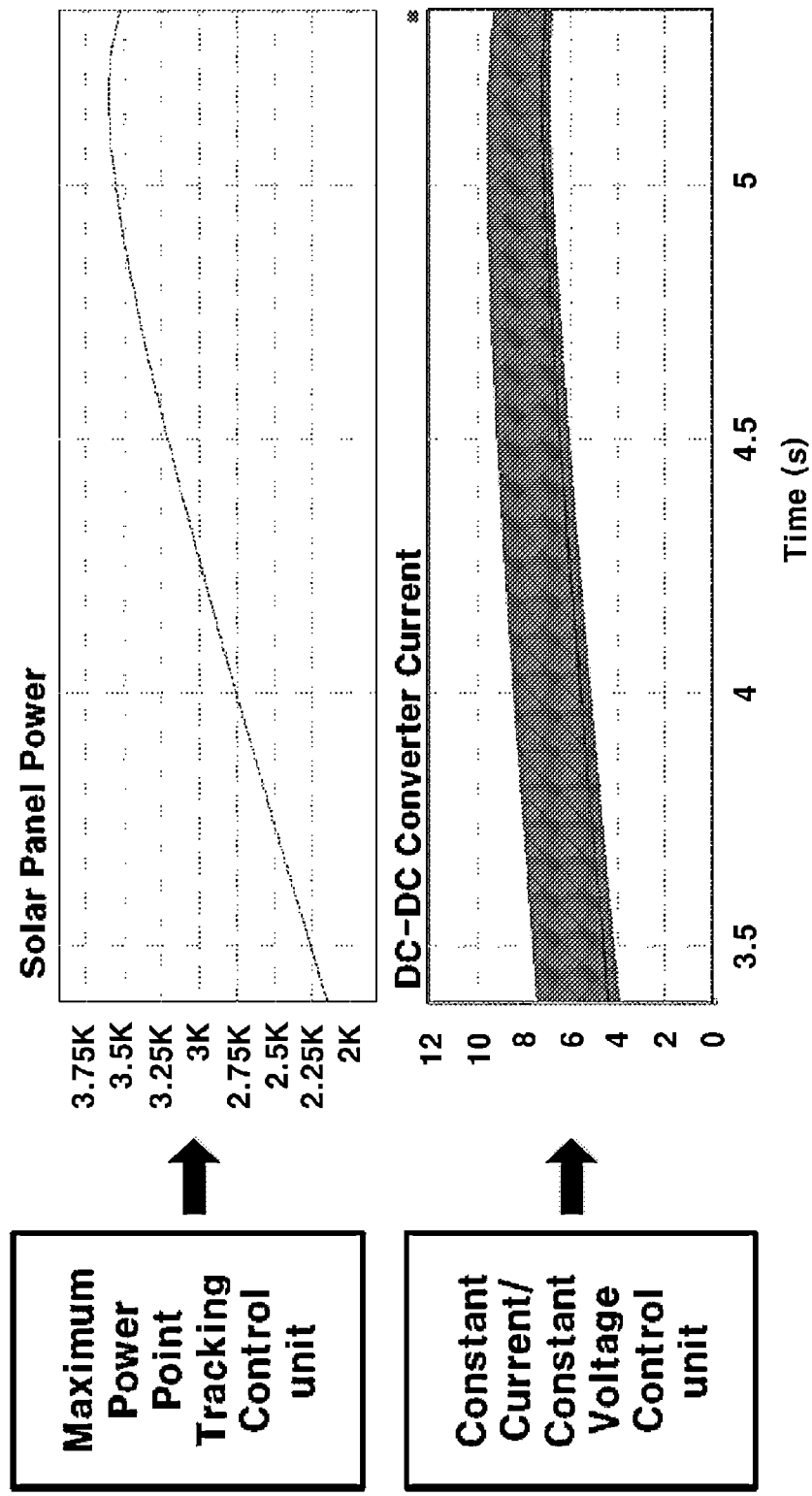

[FIG. 11]
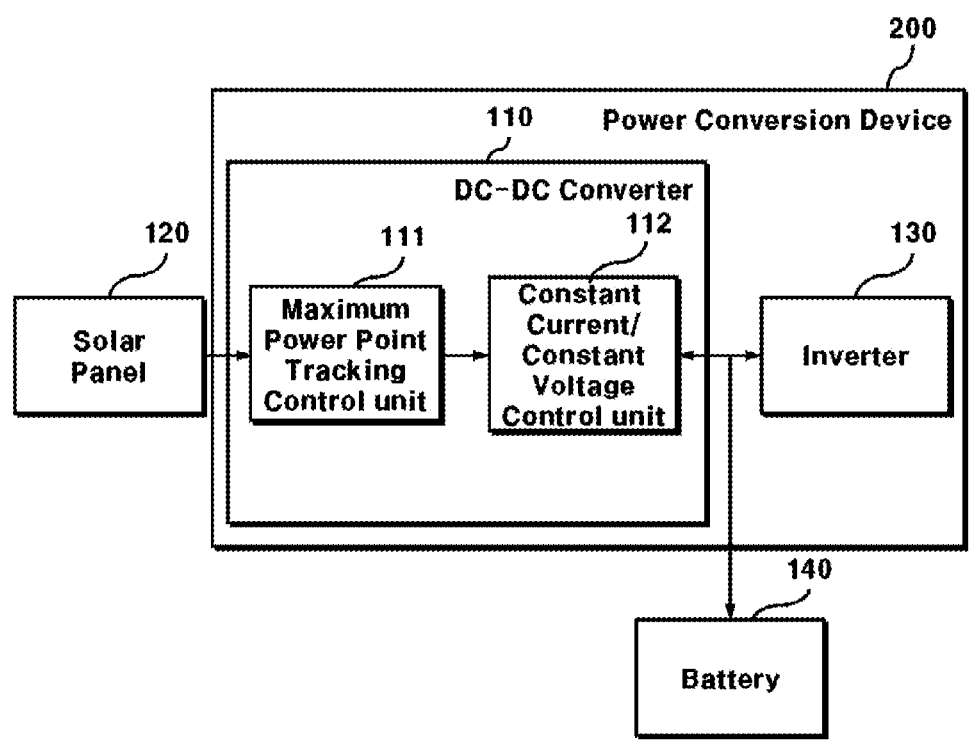

[FIG. 12]
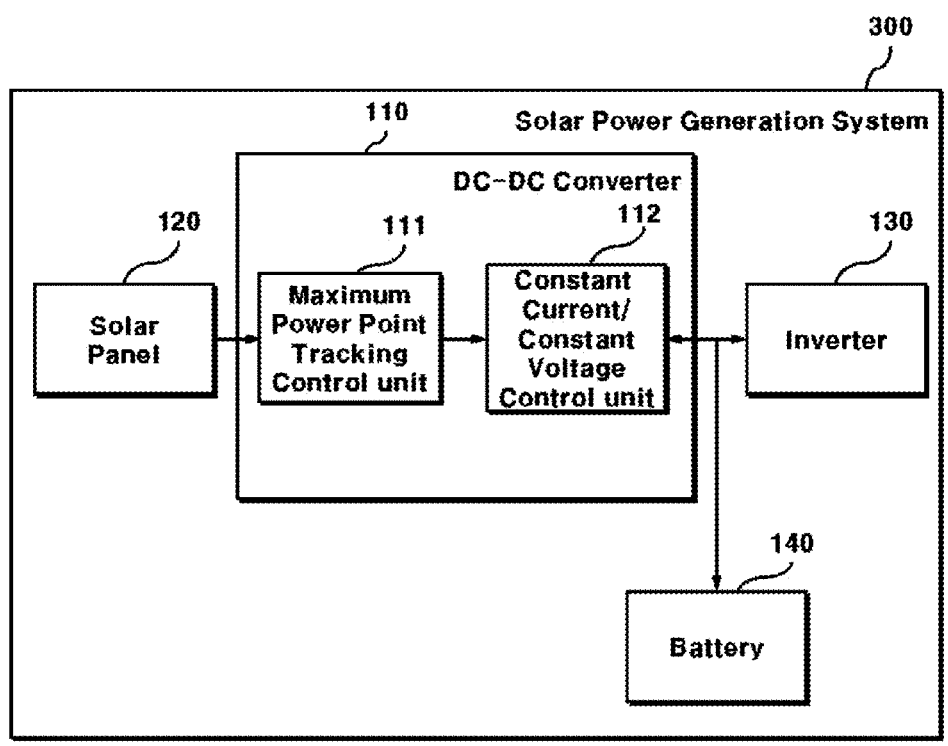

DC-DC CONVERTER, POWER CONVERSION DEVICE, AND SOLAR POWER GENERATION SYSTEM

CROSS-REFERENCE TO RELATED PATENT APPLICATIONS

This application is a U.S. National Stage Application under 35 U.S.C. § 371 of PCT Application No. PCT/KR2022/004269, filed Mar. 25, 2022, which claims priority to Korean Patent Application No. 10-2021-0039924, filed Mar. 26, 2021, whose entire disclosures are hereby incorporated by reference.

TECHNICAL FIELD

The teachings in accordance with exemplary and non-limiting embodiments of this invention relate generally to a DC-DC converter, a power conversion device and a solar power generation system, and more particularly, to a DC-DC converter, a power conversion device and a solar power generation system capable of performing a maximum power point tracking control and constant current/constant voltage control using a single DC-DC converter.

BACKGROUND ART

A solar power generation is an eco-friendly energy generation method that has been widely used to replace conventional chemical or nuclear power generation. The solar power generation is divided into stand-alone type where batteries are connected to a connecter and a grid-connected type where batteries are connected to a power grid. In general, the stand-alone power generation is composed of solar cells, storage batteries, power conversion device, and the like. The grid-connected systems are configured to connect to a commercial power source and exchange the power with the load grid.

A battery may be connected between the photovoltaic (PV) module and an inverter (12). As shown in FIG. 1, when the battery voltage is lower than or equal to the voltage outputted from a solar panel (11), in addition to the DC-DC converter 1(14) performing maximum power point tracking, a separate DC-DC converter 2(15) is required for stable charging of a battery (13), that is, two DC-DC converters are required, which increases the cost/size/weight and decreases the efficiency.

Furthermore, as shown in FIG. 2, there may be a problem that the battery utilization rate cannot be optimized when the maximum output voltage of the battery (16) is greater than the voltage outputted from the solar panel (11). For example, if the PV voltage range is 350~550V and the battery voltage is 500~800V or 1000V, the output voltage of the DC-DC converter 1(14) is 500V~550V due to boosting of the PV voltage, and if the battery voltage is 500V, the output voltage of the DC-DC converter 1(14) is higher than the battery (16) voltage, so that the single battery utilization rate cannot be optimized.

DETAILED DESCRIPTION OF INVENTION

Technical Subject

The technical subject that the present invention aims to solve is to provide a DC-DC converter, a power conversion device and a solar power generation system capable of performing a maximum power point tracking control and constant current/constant voltage control using a single DC-DC converter.

Technical Solution

In one general aspect of the present invention, there may be provided a DC-DC converter, comprising:
- a maximum power point tracking control unit for performing a maximum power point tracking control when a communication module is connected to a solar panel; and
- a constant current/constant voltage control unit for receiving an input of power outputted from the maximum power point tracking control unit, outputting power having a constant voltage at the time of constant voltage control, and outputting power having a constant current at the time of constant current control.

Preferably, but not necessarily, the constant current/constant voltage control unit may selectively perform a constant voltage control or constant current control depending on the magnitude of the voltage outputted from the maximum power point control unit.

Preferably, but not necessarily, the constant current/constant voltage control unit may include an output end connection unit to which at least one of the battery and the inverter is connected.

Preferably, but not necessarily, the constant current/constant voltage control unit may perform the constant current control when the magnitude of the voltage outputted from the maximum power point tracking control unit is within the safety range of the battery or within the operating range of the inverter, and may perform the constant voltage control when the magnitude of the voltage outputted from the maximum power point tracking control unit is outside the safety range of the battery or outside the operating range of the inverter.

Preferably, but not necessarily, the maximum power point tracking control unit may include a plurality of maximum power point tracking control units according to the number of solar panels connected thereto, and the constant current/constant voltage control unit may be connected to the plurality of maximum power point tracking control units.

Preferably, but not necessarily, the maximum power point tracking control unit may comprise a step-down circuit to reduce the voltage of the power outputted from the solar panel, and the constant current/constant voltage control unit may comprise a step-up circuit to increase the voltage of the power whose voltage has been reduced, and the power whose voltage is reduced in the step-down circuit may be transmitted to the step-up circuit through a first capacitor.

Preferably, but not necessarily, the step-down circuit may include: a first switching element and a second switching element connected in series; and a first inductor connected in parallel between the first switching element and the second switching element, the step-up circuit may include: a second inductor connected with the first inductor; and a third switching element and a fourth switching element connected in series, the second inductor may be connected in parallel between the third switching element and the fourth switching element, and the first capacitor may be connected in parallel between the first inductor and the second inductor.

Preferably, but not necessarily, the maximum power point tracking control unit may include a step-up circuit to step up the voltage of the power outputted from the solar panel, and the constant current/constant voltage control part may include a step-down circuit to step down the voltage of the power whose voltage has been stepped up, and the power whose voltage is stepped up in the step-up circuit may be transmitted to the step-down circuit through the second capacitor.

Preferably, but not necessarily, the step-up circuit may include: a third inductor connected to an output terminal of the solar panel; and a fifth switching element and a sixth switching element connected in series, the third inductor may be connected in parallel between the fifth switching element and the sixth switching element; and a step-down circuit may include: a seventh switching element and an eighth switching element connected in series; and a fourth inductor connected in parallel between the seventh switching element and the eighth switching element, and the second capacitor may be connected in parallel between the fifth switching element and the seventh switching element.

In another general aspect of the present invention, there may be provided a power conversion device, comprising:
 a DC-DC converter outputting a power with a constant voltage under constant voltage control, and outputting a power with a constant current under constant current control while performing a maximum power point tracking control when connected to a solar panel; and
 an inverter transmitting an output of the DC-DC converter to a load or power grid, or receiving a power from the power grid.

Preferably, but not necessarily, the power conversion device may include a battery connection connected by a battery on a DC link between the DC-DC converter and the inverter.

Preferably, but not necessarily, the DC-DC converter may perform constant current control when the magnitude of the output voltage according to the maximum power point tracking control is within the safety range of the battery or within the operating range of the inverter, and may perform constant voltage control when the magnitude of the output voltage according to the maximum power point tracking control is outside the safety range of the battery or outside the operating range of the inverter.

In still another general aspect of the present invention, there may be provided a solar power generation system, comprising:
 a DC-DC converter outputting a power having a constant voltage when controlling a constant voltage, and outputting power having a constant current when controlling a constant current when connected to a solar panel, while performing a maximum power point tracking control when connected to a solar panel;
 an inverter transmitting a power outputted by the DC-DC converter to a load or a power grid, or receiving a power from the power grid and applying the same to a battery; and
 a battery that is charged by receiving a power from the DC-DC converter or the inverter, and discharged by outputting a power to the inverter.

Preferably, but not necessarily, the DC-DC converter may perform constant current control when the magnitude of the output voltage according to the maximum power point tracking control is within the safety range of the battery or within the operating range of the inverter, and may perform constant voltage control when the magnitude of the output voltage according to the maximum power point tracking control is outside the safety range of the battery or outside the operating range of the inverter.

Advantageous Effects of Invention

According to the exemplary embodiments of the present invention, the overall system size can be reduced, system cost can be reduced, and battery utilization can be optimized by performing the maximum power point tracking control and constant current/constant voltage control using a single DC-DC converter.

In addition, batteries can be connected without a separate DC-DC converter, and high-voltage batteries can be used regardless of the output voltage of the solar panel and the battery voltage.

BRIEF DESCRIPTION OF DRAWINGS

FIGS. 1 and 2 are block diagrams of solar power generation system according to a comparative exemplary embodiment of the present invention.

FIG. 3 is a block diagram of a DC-DC converter according to an exemplary embodiment of the present invention.

FIGS. 4 to 10 are drawings for explaining a DC-DC converter according to an exemplary embodiment of the present invention.

FIG. 11 is a block diagram of power conversion system according to an exemplary embodiment of the present invention.

FIG. 12 is a block diagram of a solar power generation system according to an exemplary embodiment of the present invention.

BEST MODE

Hereinafter, exemplary embodiments of the present invention will be described in detail with reference to the accompanying drawings.

However, the present invention is not limited to the specific embodiments described, but may be implemented in a variety of different forms, and one or more of its components may be optionally combined or substituted between embodiments within the scope of the present invention.

Furthermore, terms (including technical and scientific terms) used in the embodiments of the present invention, unless expressly specifically defined and described, are to be interpreted in the sense in which they would be understood by a person of ordinary skill in the art to which the present invention belongs, and commonly used terms, such as dictionary-defined terms, are to be interpreted in light of their contextual meaning in the relevant art.

Furthermore, the terms used in the embodiments of the invention are intended to describe the embodiments and are not intended to limit the invention.

In this specification, the singular may include the plural unless the context otherwise requires, and references to "at least one (or more) of A and (or) B and C" may include one or more of any combination of A, B, and C that may be assembled.

In addition, the terms first, second, A, B, (a), (b), and the like may be used to describe components of embodiments of the invention. Such terms are intended only to distinguish one component from another, and are not intended to limit the nature or sequence or order of such components by such terms.

Furthermore, when a component is described as "connected," "coupled," or "attached" to another component, it can include cases where the component is "connected," "coupled," or "attached" to the other component directly, as well as cases where the component is "connected," "coupled," or "attached" to another component that is between the component and the other component.

Furthermore, when described as being formed or disposed "above" or "below" each component, "above" or "below"

includes not only when two components are in direct contact with each other, but also when one or more other components are formed or disposed between the two components. Furthermore, when expressed as "above" or "below", it may include the meaning of upward as well as downward with respect to a single component.

FIG. 3 is a block diagram of a DC-DC converter according to an exemplary embodiment of the present invention.

The DC-DC converter (110) according to one exemplary embodiment of the present invention may comprise a maximum power point tracking control unit (111) and a constant current/voltage control unit (112).

The maximum power point tracking control unit (111) may perform a maximum power point tracking control when connected to a solar panel (120).

The solar panel (120) may utilize sunlight to generate electricity using the photoelectric effect to generate photovoltaic (PV) power. The photoelectric effect is an emission of electrons when light above a certain frequency strikes a certain metal material, and the power is generated by forming a p-n junction using a p-type semiconductor and an n-type semiconductor, and generating a current using electrons generated by the photoelectric effect. The solar panel (120) may be formed using silicon or the like, and may be formed in the form of a wafer. The solar panel (120) may be located in a field that can receive good sunlight, or on an exterior wall of a building, a rooftop, or the like, and generate electricity using sunlight. At this time, the solar panel (120) may be formed as a BIPV (building-integrated photovoltaic) that is integrated with a building.

The maximum power point tracking control unit (111) may convert and output a power from the solar panel (120). The maximum power point tracking control unit 111 can increase the efficiency of solar power generation by utilizing maximum power point tracking (MPPT). Depending on the characteristics of the relationship between current and voltage and the relationship between voltage and power in solar power generation, the maximum power may be the power at about 80% of the maximum voltage rather than the maximum voltage. Because this maximum power point continues to change depending on the magnitude of the voltage and current generated by the solar panel (120), it is necessary to continue to find a point where the maximum power point can be generated. In other words, in order to track the maximum power rather than the maximum voltage, the magnitude of the voltage and current may be varied to achieve the maximum power, i.e., the voltage can be decreased and the current increased in the direction of increasing power, or the voltage can be increased and the current decreased. The maximum power point tracking control unit (111) may include one or more switching elements, and may follow the maximum power point by controlling a time ratio of the switching elements. Here, the time ratio is the ratio of the time when current flows to the time when no current flows, and in the case of a switching element, it refers to the rate of switching on, and the time ratio is also known as the duty ratio or duty cycle.

As shown in FIG. 4, the power outputted from the maximum power point tracking control unit (111) may initially track the maximum power point, and as the power increases, the maximum power can be maintained by tracking the maximum power after a certain period of time.

The constant current/constant voltage control unit (112) may receive the power outputted from the maximum power point tracking control unit (111) as an input, and output a constant voltage when controlling the constant voltage, and output a constant current when controlling the constant current.

The power generated by the solar panel (120) may be generated at a maximum power via the maximum power point tracking control unit (111), and may be used to charge a battery (140) or transmitted to a load or power grid via an inverter (130). Here, the constant current/constant voltage control unit (112) may include an output end connection (not shown) to which at least one of the battery (140) and the inverter (130) is connected. The output end connection may be a DC link end.

The power outputted from the DC-DC converter (110) can be used to charge the battery (140) connected to the output end connection, or it can be transmitted to a load connected to the inverter (130) or to the power grid. Here, the load is a power receiving device connected to utilize the power generated by the photovoltaic power generation, which may be devices that consume power within a building, such as when the photovoltaic power generation system is implemented in a building. A power grid refers to a commercial power network represented by a grid. Power beyond the power required by the load can be transmitted to the grid and sold.

In addition to transmitting the power generated by solar power generation to a load or a power grid, the inverter (130) may receive a power from the power grid. In environments where solar power is difficult to be generated, or at times when external power is inexpensive, a power may be received from the power grid rather than solar power generation to charge the battery (140).

The inverter (130) may receive a power from the DC-DC converter (110), which outputs DC power, and convert the same to AC power utilized by a load or the power grid and output the same, i.e., convert DC power to AC power. In addition, the inverter (130) may receive an AC power from the power grid and convert the same to DC power utilized by the battery (140) and output the same. In other words, the inverter (130) may have an input and an output that can vary in both directions, and may be referred to as a bidirectional AC-DC converter that can convert AC to DC or DC to AC.

As the voltage and current of the power outputted by the maximum power point tracking control unit (111) may vary instead of being constant, and as described with reference to FIGS. 1 and 2, the utilization rate of the battery is not optimized when the battery is charged and discharged. To optimize the utilization of the battery, the constant current/constant voltage control unit (112) may receive the power outputted from the maximum power point tracking control unit (111) as an input, convert the same into power with a constant voltage or power with a constant current, and output the same to the battery (140) or the inverter (130).

As shown in FIG. 4, a current may be kept constant during the constant current control and the voltage may be kept constant during the constant voltage control. During the constant current (CC) control, the magnitude of the voltage can be varied so that the current is constant according to the applied power, and during the constant voltage (CV) control, the magnitude of the current can be varied so that the voltage is constant according to the applied power. Constant Current/Constant Voltage (CC/CV) control can be performed in various other ways.

The constant current/constant voltage control unit (112) can selectively perform the constant voltage control or constant current control depending on the magnitude of the voltage outputted from the maximum power point tracking control unit (111). If the magnitude of the voltage of the power outputted from the maximum power point tracking control unit (111) is within a threshold range, the constant current control can be performed, and if it is outside the threshold range, for example, lower than the threshold range or higher than the threshold range, the constant voltage control can be performed.

When the battery (140) or the inverter (130) is connected to the output end, the constant current/constant voltage control unit (112) may perform the constant current control when the magnitude of the voltage outputted from the maximum power point tracking control unit (111) is within the safety range of the battery (140) or within the operating range of the inverter (130), and may perform constant voltage control when the magnitude of the voltage outputted from the maximum power point tracking control unit (111) is outside the safety range of the battery (140) or outside the operating range of the inverter (130). When the magnitude of the voltage outputted from the maximum power point tracking control unit (111) is within a safe range of the voltage according to the state of charge (SOC) of the battery (140), a change in the voltage does not affect the battery (140). At this time, the power may be transmitted as the current flows, and the constant current control may be performed for stable power transmission to the battery (140) or to the inverter (130).

Here, the safe range of the battery (140) may vary depending on the specification of the connected battery (140). The safe range of the battery (140) may vary based on the voltage rating or durability of the battery (140), for example. The safe range of the battery (140) may also be set by a user. The operating range of the inverter (130) may be set as a minimum voltage required to transmit the required power to a load or power grid through the inverter (130) and as a maximum voltage based on the voltage or current ratings of the elements comprising the inverter (130). If the magnitude of the voltage outputted from the maximum power point tracking control unit (111) is within the safety range of the battery (140) or within the operating range of the inverter (130), the battery (140) or the inverter (130) may operate normally without increasing or decreasing the voltage, whereby the constant current control may be performed.

When the magnitude of the voltage outputted from the maximum power point tracking control unit (111) is outside the safety range of the battery (140) or outside the operating range of the inverter (130), the magnitude of the voltage affects the operation of the battery (140) or the inverter (130), so it is necessary to step up or step down the voltage so that power with a constant voltage can be outputted.

For example, when a high voltage is outputted that exceeds the rated voltage of the battery (140), which may cause damage to the battery (140), a constant voltage control may be performed to reduce an output voltage to a constant voltage. Alternatively, when a low voltage is outputted that makes it difficult for the inverter to operate normally, a constant voltage control may be performed to increase the voltage to a certain voltage to ensure a smooth power transmission to the inverter (130). Since the constant voltage control is possible, batteries of various voltages may be connected, such as high-voltage batteries. It goes without saying that the constant current control or constant voltage control may be performed under various other conditions.

The maximum power point tracking control unit may include a plurality of maximum power point tracking control units according to the number of solar panels connected thereto, and the constant current/constant voltage control unit may be connected to the plurality of maximum power point tracking control units. As shown in FIG. 5, when the number of solar panels is n, a plurality of maximum power point tracking control units may be formed according to the number of solar panels (120) to 120n, and the plurality of maximum power point tracking control units (111 to 111n) may be connected to one constant current/constant voltage control unit (112). By connecting the plurality of maximum power point tracking control units (111 to 111n) to the one constant current/constant voltage control unit (112), multiple inputs and increased power capacity may be made to be possible.

The maximum power point tracking control part may include a step-down circuit to reduce the voltage of the power outputted from the solar panel, and the constant current/constant voltage control unit may include a step-up circuit to increase the voltage of the power whose voltage is reduced, and the power whose voltage is reduced in the step-down circuit may be transmitted to the step-up circuit through the first capacitor. The maximum power point tracking control unit (111) may be configured as a step-down circuit, and the reduced power may be transmitted to the constant current/constant voltage control unit (112), which is configured as a step-up circuit, through the first capacitor, which is a common capacitor of the maximum power point tracking control unit (111) and the constant current/constant voltage control unit (112).

As shown in FIG. 6, the step-down circuit of the maximum power point tracking control unit (111) may include a first switching element (601) and a second switching element (602) connected in series, and a first inductor (603) connected in parallel between the first switching element (601) and the second switching element (602), a step-up circuit of the constant current/constant voltage control unit (112) may include a second inductor (606) connected to the first inductor (603), and a third switching element (604) and a fourth switching element (605) connected in series, the second inductor (606) may be connected in parallel between the third switching element (604) and the fourth switching element (605), and the first capacitor (607) may be connected in parallel between the first inductor (603) and the second inductor (606).

The maximum power point tracking control unit (111) may be implemented as a buck circuit comprising two switching elements (601, 602) and a first inductor (603), and the constant current/constant voltage control unit (112) may be implemented as a boost circuit comprising a second inductor (606) and two switching elements (604, 605). Here, the switching element may be a MOSFET, and the second switching element (602) and third switching element (604) may be diodes. The power that is stepped down through the buck circuit may be passed through the first capacitor (607) to the boost circuit to be stepped up. Capacitors (608, 609) may be connected to the solar panel (120) and the inverter (130) to stabilize power variability.

The battery (140) may be connected to an output end of the constant current/constant voltage control unit (112), but may be connected via a BPU (160). Here, the BPU (Battery Protection Unit) is a battery protection device that may comprise fuses, MOSFETs, relays, switches-resistors, etc. to allow for rapid shut down. When multiple solar panels are connected, as shown in FIG. 7, a step-down circuit corresponding to the maximum power point tracking control unit (111) may be added in parallel, but two pairs of switching elements of the step-down circuit may be connected in parallel. In other words, the first inductor is not added, but the number of switching elements is increased by a multiple.

The maximum power point tracking control part (111) may be configured as a step-up circuit to step-up the voltage of the power outputted from the solar panel, and the constant current/constant voltage control unit (112) may be configured as a step-down circuit to step-down the voltage of the power whose voltage is stepped-up, and the power whose voltage is stepped-up in the step-up circuit may be transmitted to the step-down circuit through the second capacitor.

As shown in FIG. 8, the step-up circuit of the maximum power point tracking control unit (111) includes a third inductor (801) connected to an output terminal of the solar panel, a fifth switching element (802) and a sixth switching element (803) connected in series, and the third inductor (801) may be connected in parallel between the fifth switching element (802) and the sixth switching element (803), The step-down circuit of the constant current/constant voltage control section (112) may include a seventh switching element (804) and an eighth switching element (805) connected in series, a fourth inductor (806) connected in parallel between the seventh switching element (804) and the eighth switching element (805), and a second capacitor (807) may be connected in parallel between the fifth switching element (802) and the seventh switching element (804).

Unlike FIG. 6, which is implemented as a buck-boost, it may be implemented as a boost-buck, as shown in FIG. 8. Specifically, the maximum power point tracking control unit (111) may be implemented as a BOOST circuit comprising a third inductor (801) and two switching elements (802, 803), and the constant current/constant voltage control unit (112) may be implemented as a BUCK circuit comprising two switching elements (804, 805) and a fourth inductor (806). Here, the switching elements may be MOSFETs, and the fifth switching element (802) and eighth switching element (805) may be diodes. The power that is boosted through the boost circuit may be passed through the second capacitor (807) to the buck circuit.

In the case of FIG. 6, step-down is followed by step-up, and in the case of FIG. 8, step-up is followed by step-down. As shown in FIG. 6, when the step-down is performed first, the current flowing in the first inductor (603) and the second inductor 606 becomes larger, and the size of the inductor becomes larger. On the other hand, when the step-up is performed first, as shown in FIG. 8, the voltage across the second capacitor (807) and the switching elements becomes larger, requiring the use of capacitors and switching elements with larger voltage ratings. The implementation schematic circuit drawings according to FIG. 6 or FIG. 8 may be utilized according to the user's purpose or choice.

When multiple solar panels are connected as in the implementation schematic circuit drawing of FIG. 8, a step-up circuit corresponding to the maximum power point tracking control unit (111) is added in parallel, as shown in FIG. 9. In this case, unlike FIG. 7, both the first inductor and the switching element are increased by a multiple. When connected in parallel, the number of elements in the case of FIG. 7 is smaller than in the case of FIG. 9, which may be advantageous in terms of size and cost. FIG. 10 shows the solar panel power according to the maximum power point tracking control unit (111) and the DC-DC converter output current according to the constant current/constant voltage control unit (112), and it can be seen that the solar panel power becomes the maximum power through the maximum power point tracking of the maximum power point tracking control unit (111) over time, and the DC-DC converter output current has a constant current according to the constant current value.

FIG. 11 is a block diagram of a power conversion device according to one exemplary embodiment of the present invention, and FIG. 12 is a block diagram of a solar power system according to one exemplary embodiment of the present invention. The detailed description of each configuration in FIGS. 11 and 12 corresponds to the detailed description of the DC-DC converter in FIGS. 1 to 10, and the redundant description will be omitted hereinafter. A power conversion device (200) according to one exemplary embodiment of the present invention may comprise a DC-DC converter (110) and an inverter (130).

The DC-DC converter (110) may perform the maximum power point tracking control when connected to the solar panel (120), and output a constant voltage when controlling a constant voltage, and output a constant current when controlling a constant current. The inverter (130) may transmit the output of the DC-DC converter (110) to a load or a power grid, or receives power from the power grid.

The DC-DC converter (110) may include a battery connection (not shown) wherein a battery (140) is connected to the DC link between the DC-DC converter (110) and the inverter (130), and the DC-DC converter (110) may perform constant current control when the size of the output voltage according to the maximum power point tracking control is within the safety range of the battery or within the operating range of the inverter, and may perform constant voltage control when the size of the output voltage according to the maximum power point tracking control is outside the safety range of the battery or outside the operating range of the inverter A solar power generation system (300) according to one exemplary embodiment of the present invention may comprise a DC-DC converter (110), an inverter (130), and a battery (140), and may include a solar panel (120).

The DC-DC converter (110) may perform the maximum power point tracking control when connected to the solar panel (120), such that the voltage outputs a constant power when the voltage is controlled, and the current outputs a constant power when the current is controlled. The inverter (130) may transmit the power outputted by the DC-DC converter to the load or the power system, or receive the power from the power system and apply the same to the battery (140). The battery (140) may be charged by receiving power from the DC-DC converter (110) or the inverter 130, and discharged by outputting the power to the inverter (130).

The DC-DC converter (110) may perform the constant current control when the magnitude of the output voltage according to the maximum power point tracking control is within the safety range of the battery or within the operating range of the inverter, and may perform the constant voltage control when the magnitude of the output voltage according to the maximum power point tracking control is outside the safety range of the battery or outside the operating range of the inverter.

While the exemplary embodiments of the present invention have been described with reference to the accompanying drawings, one having ordinary skill in the art to which the present invention belongs will understand that the invention may be practiced in other specific forms without altering its technical ideas or essential features. It should therefore be understood that the embodiments described above are exemplary and non-limiting in all respects. The scope of the invention is set forth not in foregoing description but in the claims of the invention, and all differences within the scope of equivalents are to be construed as being incorporated into the invention.

The invention claimed is:

1. A DC-DC converter, comprising:
a maximum power point tracking control unit configured to perform a maximum power point tracking control when connected to a solar panel; and
a constant current/constant voltage control unit configured to receive power output from the maximum power point tracking control unit, output power having a constant voltage at a constant voltage control, and output power having a constant current at a constant current control.

2. The DC-DC converter of claim 1, wherein the constant current/constant voltage control unit selectively performs a constant voltage control or a constant current control according to magnitude of a voltage outputted from the maximum power point control unit.

3. The DC-DC converter of claim 1, wherein the constant current/constant voltage control unit comprises an output terminal connection unit connected to at least one of a battery and an inverter.

4. The DC-DC converter of claim 3, wherein the constant current/constant voltage control unit performs the constant current control when the magnitude of the voltage outputted from the maximum power point tracking control unit is within a safety range of the battery or within an operating range of the inverter, and performs the constant voltage control when the magnitude of the voltage outputted from the maximum power point tracking control unit is out of the safety range of the battery or out of the operating range of the inverter.

5. The DC-DC converter of claim 1, wherein the maximum power point tracking control unit comprises a plurality of maximum power point tracking control units according to the number of solar panels connected thereto, and the constant current/constant voltage control unit is connected to the plurality of maximum power point tracking control units.

6. The DC-DC converter of claim 1, wherein the maximum power point tracking control unit comprises a step-down circuit to reduce the voltage of the power outputted from the solar panel,
wherein the constant current/constant voltage control unit comprises a step-up circuit to increase the voltage of the power whose voltage has been reduced, and
wherein the power whose voltage is reduced in the step-down circuit is transmitted to the step-up circuit through a first capacitor.

7. The DC-DC converter of claim 6, wherein the step-down circuit comprises:
a first switching element and a second switching element connected in series; and
a first inductor connected in parallel between the first switching element and the second switching element,
wherein the step-up circuit comprises:
a second inductor connected with the first inductor; and
a third switching element and a fourth switching element connected in series,
wherein the second inductor is connected in parallel between the third switching element and the fourth switching element, and
wherein the first capacitor is connected in parallel between the first inductor and the second inductor.

8. The DC-DC converter of claim 1, wherein the maximum power point tracking control unit comprises a step-up circuit to step up the voltage of the power outputted from the solar panel,
wherein the constant current/constant voltage control part comprises a step-down circuit to step down the voltage of the power whose voltage has been stepped up, and
wherein the power whose voltage is stepped up in the step-up circuit is transmitted to the step-down circuit through a second capacitor.

9. The DC-DC converter of claim 8, wherein the step-up circuit comprises: a third inductor connected to an output terminal of the solar panel; and a fifth switching element and a sixth switching element connected in series,
wherein the third inductor is connected in parallel between the fifth switching element and the sixth switching element,
wherein a step-down circuit comprises: a seventh switching element and an eighth switching element connected in series; and a fourth inductor connected in parallel between the seventh switching element and the eighth switching element, and
wherein the second capacitor is connected in parallel between the fifth switching element and the seventh switching element.

10. A power conversion device, comprising:
a DC-DC converter configured to perform a maximum power point tracking control when connected to a solar panel, output a power having a constant voltage at a constant voltage control, and output a power having a constant current at a constant current control; and
an inverter configured to transmit an output of the DC-DC converter to a load or a power grid, or receive a power from the power grid.

11. The power conversion device of claim 10, further comprising: a battery connection unit connected to a battery on a DC link between the DC-DC converter and the inverter.

12. The power conversion device of claim 11, wherein the DC-DC converter performs a constant current control when magnitude of an output voltage according to the maximum power point tracking control is within a safety range of the battery or within an operating range of the inverter, and performs a constant voltage control when magnitude of the output voltage according to the maximum power point tracking control is out of the safety range of the battery or out of the operating range of the inverter.

13. The power conversion device of claim 10, wherein the DC-DC converter comprises:
a maximum power point tracking control unit configured to perform the maximum power point tracking control when connected to the solar panel; and
a constant current/constant voltage control unit configured to receive power output from the maximum power point tracking control unit, output power having the constant voltage at the constant voltage control, and output power having the constant current at the constant current control.

14. The power conversion device of claim 13, wherein the maximum power point tracking control unit comprises a step-down circuit to reduce the voltage of the power outputted from the solar panel,
wherein the constant current/constant voltage control unit comprises a step-up circuit to increase the voltage of the power whose voltage has been reduced, and
wherein the power whose voltage is reduced in the step-down circuit is transmitted to the step-up circuit through a first capacitor.

15. The power conversion device of claim 14, wherein the step-down circuit comprises:
a first switching element and a second switching element connected in series; and a first inductor connected in parallel between the first switching element and the second switching element,
wherein the step-up circuit comprises:
a second inductor connected with the first inductor; and
a third switching element and a fourth switching element connected in series,
wherein the second inductor is connected in parallel between the third switching element and the fourth switching element, and
wherein the first capacitor is connected in parallel between the first inductor and the second inductor.

16. A solar power generation system, comprising:
a DC-DC converter configured to perform a maximum power point tracking control when connected to a solar panel, output a power having a constant voltage at a constant voltage control, and output a power having a constant current at a constant current control;
an inverter configured to transmit an output of the DC-DC converter to a load or a power grid, or receive a power from the power grid; and
a battery charged by receiving a power from the DC-DC converter or the inverter, and discharged by outputting a power to the inverter.

17. The solar power generation system of claim 16, wherein the DC-DC converter performs a constant current control when magnitude of an output voltage according to the maximum power point tracking control is within a safety range of the battery or within an operating range of the inverter, and performs a constant voltage control when magnitude of the output voltage according to the maximum power point tracking control is out of the safety range of the battery or out of the operating range of the inverter.

18. The solar power generation system of claim 16, wherein the DC-DC converter comprises:

a maximum power point tracking control unit configured to perform the maximum power point tracking control when connected to the solar panel; and
a constant current/constant voltage control unit configured to receive power output from the maximum power point tracking control unit, output power having the constant voltage at the constant voltage control, and output power having the constant current at the constant current control.

19. The solar power generation system of claim 18, wherein the maximum power point tracking control unit comprises a step-down circuit to reduce the voltage of the power outputted from the solar panel,
wherein the constant current/constant voltage control unit comprises a step-up circuit to increase the voltage of the power whose voltage has been reduced, and
wherein the power whose voltage is reduced in the step-down circuit is transmitted to the step-up circuit through a first capacitor.

20. The solar power generation system of claim 19, wherein the step-down circuit comprises:
a first switching element and a second switching element connected in series; and
a first inductor connected in parallel between the first switching element and the second switching element,
wherein the step-up circuit comprises:
a second inductor connected with the first inductor; and
a third switching element and a fourth switching element connected in series,
wherein the second inductor is connected in parallel between the third switching element and the fourth switching element, and
wherein the first capacitor is connected in parallel between the first inductor and the second inductor.

* * * * *